Patented Mar. 19, 1940

2,194,314

UNITED STATES PATENT OFFICE 2,194,314

PREPARATION OF N-SUBSTITUTED ALKYLOL AMINES

Robert W. Maxwell, Wilmington, Del., assignor to E. I. du Pont de Nemours & Company, Wilmington, Del., a corporation of Delaware No Drawing. Application July 16, 1938, Serial No. 219,603

11 Claims. (Cl. 260—584)

This invention relates to the manufacture of N-alkyl-alkanolamines, and especially to the preparation of N-dialkyl alkanolamines. More specifically the invention relates to the preparation of N-methyl ethanolamines.

Heretofore such compounds as, for example, N-methyl ethanolamine have been prepared by reacting methyl amine with ethylene oxide at 40° to 60° C. in methanol solution. The disadvantage of such a process is that the reaction requires very careful control if the production of high molecular weight ether alcohols is to be avoided. The production of such high molecular weight ether alcohols reduces the yield of desired N-methyl ethanolamine and further increases costs by consumption of ethylene oxide in the production of undesired end products.

This invention has as its object the preparation of N-alkyl alkanolamines by a new and improved method. Another object is the preparation of N-dialkyl alkanolamines by an improved process. A further object is to provide a method which produces N-alkyl alkanolamine with minimum of side reaction products. Other objects will appear hereinafter.

These objects are accomplished by the use of the invention described herein, which invention comprises condensing an aldehyde with an amino alcohol in which the amino nitrogen atom has at least one functional hydrogen atom attached thereto and said nitrogen atom is attached to a carbon atom other than a carbon to which a hydroxyl group is attached, and catalytically hydrogenating the condensation product to give an N-alkyl alkanolamine.

In order to illustrate specifically the invention, the following examples are given. These examples, however, are merely for the purpose of illustration and do not in any way limit said invention.

Example 1

Three mols of paraformaldehyde were condensed with two mols of monoethanolamine by adding the formaldehyde with the amine in small portions. Benzene was then added and the water of condensation distilled off. Three mols of water were obtained. Thus it was concluded that the product probably had the following composition:

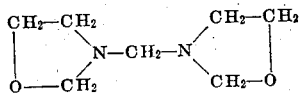

The remaining benzene was then distilled off and the residue hydrogenated at 80° C. under a pressure of 2000 pounds per square inch, using 6% Raney nickel catalyst based on the weight of the condensation product. The reaction required about 20 minutes. The catalyst was filtered off, the filtrate washed well with methanol, and the methanol removed by the addition of benzene and distillation as a benzene-methanol binary boiling at about 56° C. The product was then distilled. It consisted of approximately equimolar proportions of N-methyl aminoethanol and N-dimethyl aminoethanol. The yield of aminoethanols based on ethanolamine was approximately 85%.

If it is desired to make only N-dimethyl aminoethanol, the N-methyl aminoethanol can be condensed with another mol of formaldehyde and hydrogenated. A more direct route to N-dimethyl aminoethanol is described in Example 2.

Example 2

Ninety parts of paraformaldehyde were added in small portions to 122 parts of monoethanolamine. Much heat was developed. The mixture was then heated on the steam bath to complete solution of the paraformaldehyde after which 100 parts of benzene were added and the water of condensation removed. This amounted to 54 parts. The benzene was then distilled off and 30 more parts of paraformaldehyde added, and the mixture warmed gently on a steam bath until clear. The mixture was then hydrogenated at 70° C. under 2000 pounds per square inch pressure, using 6% Raney nickel catalyst based on the weight of the condensation product. The reaction required three hours. The product, which was a blue-green solution, was filtered to remove catalyst and the filtrate washed well with methanol. Fifty parts of benzene were then added and the methanol removed as a benzene-methanol binary, followed by distillation of the water formed in the reaction which amounted to approximately 18 parts by weight. The product was then distilled and was found to consist almost completely of N-dimethyl aminoethanol, the yield being approximately 85%.

In carrying out the preparation of N-dimethyl aminoethanol in one step, it has been found necessary to use low temperatures in the hydrogenation reaction; i. e., below 80° C., and to remove all water of condensation in order to obtain good yields. Where the temperature is allowed to rise above 80°, large proportions of tar are formed and the yield is low. Likewise, where 2 mols of paraformaldehyde are mixed with one of monoethanolamine followed by hydrogenation without water removal, yields are low and the proportion of tar formed is high.

*Example 3*

Two mols of paraformaldehyde were mixed with two mols of diethanolamine. Very little heat was given off due to the condensation, and it was necessary to heat the mixture upon the steam bath in order completely to dissolve the paraformaldehyde. The mixture was then treated with about one-third of its weight of benzene and the water of condensation distilled out. This amounted to slightly more than two molds (the excess probably being due to water present in the reagent). The mixture was then hydrogenated at 85° under 2500 pounds per square inch pressure using 6% Raney nickel catalyst, based on the weight of the condensation product. The reaction proceeded smoothly and rapidly. The reaction mixture which was blue-green in color was filtered to remove catalyst and then distilled. The yield of N-methyl diethanolamine was 93%.

In general, it has been found that reactions involving diethanolamine go more smoothly than those in which monoethanolamine is used.

*Example 4*

One mol of isobutyraldehyde was mixed with one mol of diethanolamine. Practically no heat was generated. An equivalent weight of benzene was then added and the water of condensation distilled out as a binary with the benzene. The remaining benzene was then removed and the mixture hydrogenated using 4% Raney nickel catalyst, based on the weight of condensation product, at a pressure of 2500 pounds per square inch, and a temperature of 90°. The catalyst was filtered off, and the product distilled. The yield was 90% of N-isobutyl-diethanolamine.

A particularly good way of making N-dimethylaminoethanol consists in condensing one mol of formaldehyde with one mol of monoethanolamine, followed by removal of water and catalytic hydrogenation in the usual manner. The crude reaction mixture contains approximately equimolar proportions of monoethanolamine, N-monomethyl-ethanolamine, and N-dimethyl-ethanolamine. Using these proportions, tar formation is at a minimum and yields are especially high.

The exact mechanism of the reactions involved in the alkylation of alkanolamines by the process described herein is not definitely known but it is believed, that since in the reaction between formaldehyde and the alkanolamine water is split off, that the condensation involves the formation of cyclic compounds of the oxazolidine type which in the hydrogenation step open to form the desired N-alkyl alkanolamines. Thus, for example, in the preparation of N-methyl ethanolamine the reactions involved are believed to be as follows:

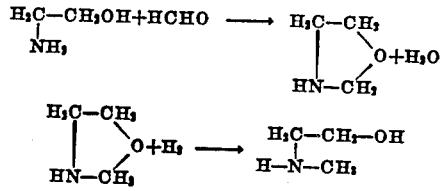

It is evident from a study of the above reactions that one could not possibly predict how the oxazolidine compound would behave when subjected to catalytic hydrogenation. The discovery that N-alkyl alkanolamines could be obtained in high yields by this method was unexpected and marks a definite advance over the art, since it makes it possible to synthesize this important class of compounds from low cost, readily available reagents.

The hydrogenated product, after removal of the catalyst, is isolated usually by distillation. In forming the aldehydeamine condensation product, it is usually sufficient to mix the amine with the aldehyde in the desired molar portions. Condensation generally takes place spontaneously. If it is desired, small amounts of alkaline catalysts may be used, but their use does not in general have any particular advantage. The crude condensation mixture can then be hydrogenated. However, it is preferable that the water of condensation be first removed. This is easily accomplished by distillation with a water-immiscible liquid, such as benzene or toluene. This water-immiscible liquid may be added prior to or during condensation or it may be added after the condensation reaction has taken place. Following the removal of the water, the condensation product may be further purified by distillation or other suitable means; however, such additional purification is by no means necessary.

The amines which can be used may be any primary or secondary amine containing a hydroxyl group attached to a carbon atom which is directly linked to the carbon atom to which the amino nitrogen is attached. Such compounds, for example, are monoethanolamine, diethanolamine, monopropanolamine, dipropanolamine, N-methyl ethanolamine, N-methyl propanolamine, N-decyl ethanolamine, N-methyl isobutanolamine, cyclohexanolamine, N-acetyl aminoethanol, N-stearyl aminopropanol, etc. In general, however, the ethanolamines are most satisfactory for the reaction, because of the great ease with which they condense with aldehydes.

The term "alkanolamine" is intended to include alkanolamines in which the hydroxyl is attached to a carbon atom which is at least one carbon removed from the carbon atom to which the amino nitrogen is attached. The term is also intended to include those alkanolamines in which one, but not both, of the amino hydrogens is replaced by methyl, ethyl, phenyl, acyl groups, etc.

In the practice of this invention a preformed oxazolidine condensation product derived from a wide range of aldehydes may be used. Broadly, oxazolidine derivatives made from all aldehydes are suitable. However, oxazolidine compounds derived from aliphatic aldehydes are preferred, particularly those derived from simple aldehydes such as isobutyraldehyde and formaldehyde.

In the preferred practice of the invention formaldehyde is used because it condenses readily with alkanolamines to form stable condensation products. Other suitable aldehydes include benzaldehyde, butyraldehyde, propionaldehyde, valeraldehyde, and dodecanal. Unsaturated aldehydes such as crotonaldehyde and acrolein may also be used.

The oxazolidine ring compound may be used either in the form of the crude reaction mixture with or without additional aldehyde, or it may be used in purified form with or without additional aldehyde. Where the oxazolidine ring compound is formed from an aldehyde which tends to undergo the aldol type condensation readily, it is usually desirable to purify before hydrogenation. The water of condensation can be removed before hydrogenation or may be present. Removal is desirable, especially in those cases where the tendency to form condensation products is slight, inasmuch as removal of water tends to force the reaction to completion. The water may be removed by any convenient means. On a laboratory scale, removal by distillation with a water immiscible fluid is a very satisfactory procedure, but on a larger scale the water can be removed by simple distillation at low temperatures.

The condensation reaction between the aldehyde and alkanolamine is preferably carried out at room temperatures, but in the case of the higher aldehydes temperatures as high as 100° C. may be used. In the case of formaldehyde it is essential to carry out the condensation reaction at low temperatures, if loss in yield of the desired products is to be avoided through tar and methyl amine formation.

In the hydrogenation reaction the hydrogen pressure should be superatmospheric; that is, above one atmosphere, the upper pressure limit being determined merely by the maximum pressure that may be used in the hydrogenation vessel. Preferably the pressure should be within the range of from 2 to 200 atmospheres. The hydrogenation reaction is operative at temperatures varying from 35° C. to 200° C.; however, it is preferred to operate at temperatures below 120° C. and especially below about 80° C. The selection of temperature and pressure of course depends to a great degree upon the type of hydrogenation catalyst used. For the reaction, any hydrogenation catalyst may be considered operative; however, it is preferred to use metallic nickel or cobalt, either in the massive form or supported on such materials as kieselguhr and silica gel. Other types of hydrogenation catalysts that are practical for use in this reaction are platinum and the oxides and chromites of hydrogenating metals such as cobalt, nickel, copper, etc.

The products may be isolated by any of the usual methods for separating mixtures of amines. With the lower molecular weight amines such as the N-methyl ethanolamines, particular care must be taken to remove water before the products are distilled. Thus it is almost impossible to separate N-dimethyl-aminoethanol from the remaining products of the reaction mixture if water is present.

The invention provides a simple low-cost means of preparing a large number of N-alkyl-alkanolamines. The compounds, especially the N-substituted ethanolamines such as N-dimethyl-aminoethanol, N-isobutyl-diethanolamine, etc., are a valuable series of reagents useful in the preparation of pharmaceuticals, resins, wetting agents, etc.

As many apparently widely different embodiments of this invention may be made without departing from the spirt and scope thereof, it is to be understood that I do not limit myself to the specific embodiments thereof except as defined in the appended patent claims.

I claim:

1. The process which comprises condensing an aldehyde selected from the group consisting of open-chain aliphatic aldehydes and monocyclic aromatic aldehydes with an open-chain aliphatic amino alcohol in which the amino nitrogen atom has at least one functional hydrogen atom attached thereto and said nitrogen atom is attached to a carbon atom other than a carbon to which a hydroxyl group is attached, and catalytically hydrogenating the condensation product to give an N-alkyl alkanolamine.

2. The process in accordance with claim 1 characterized in that the water formed during the condensation reaction is removed prior to catalytically hydrogenating the condensation product.

3. The process which comprises catalytically hydrogenating at a temperature between 35° and 200° C. a condensation product of an aldehyde selected from the group consisting of open-chain aliphatic aldehydes and monocyclic aromatic aldehydes with an open-chain aliphatic amino aldehol in which the amino nitrogen atom attached thereto and said nitrogen atom is attached to a carbon atom other than a carbon to which a hydroxyl group is attached.

4. The process which comprises condensing an aldehyde selected from the group consisting of open-chain aliphatic aldehydes and monocyclic aromatic aldehydes with an open-chain aliphatic amino alcohol in which the amino nitrogen atom has at least one functional hydrogen atom attached thereto and said nitrogen atom is attached to a carbon atom which is directly linked to a carbon to which a hydroxyl group is attached, and catalytically hydrogenating the condensation product to give an N-alkyl alkanolamine.

5. The process in accordance with claim 4 characterized in that the water formed during the condensation reaction is removed prior to catalytically hydrogenating the condensation product.

6. The process which comprises catalytically hydrogenating at a temperature between 35° and 200° C. a condensation product of an aldehyde selected from the group consisting of open-chain aliphatic aldehydes and monocyclic aromatic aldehydes with an open-chain aliphatic amino alcohol in which the amino nitrogen atom has at least one functional hydrogen atom attached thereto and said nitrogen atom is attached to a carbon atom which is directly linked to a carbon to which a hydroxyl group is attached.

7. The process which comprises condensing an aldehyde selected from the group consisting of open-chain aliphatic aldehydes and monocyclic aromatic aldehydes with an ethanol amine having at least one functional hydrogen attached to the amino nitrogen and catalytically hydrogenating the condensation product.

8. The process in accordance with claim 7 characterized in that the aldehyde is an open-chain aliphatic aldehyde.

9. The process in accordance with claim 7 characterized in that the aldehyde is formaldehyde.

10. The process in accordance with claim 7 characterized in that the amine is mono-ethanolamine.

11. The process which comprises condensing formaldehyde with a hydroxy-ethylamine and catalytically hydrogenating the condensation product so as to obtain an N-methyl-aminoethanol.

ROBERT W. MAXWELL.